United States Patent [19]

Shi et al.

[11] Patent Number: 5,593,503

[45] Date of Patent: Jan. 14, 1997

[54] PROCESS FOR PRODUCING AMYLASE RESISTANT GRANULAR STARCH

[75] Inventors: Yong-Cheng Shi, Somerville; Peter T. Trzasko, Plainsboro, both of N.J.

[73] Assignee: National Starch and Chemical Investment Holding Corporation, Wilmington, Del.

[21] Appl. No.: 479,073

[22] Filed: Jun. 7, 1995

[51] Int. Cl.$^6$ ............ C08B 30/00; C08B 30/12; A23L 1/05

[52] U.S. Cl. ............... 127/71; 127/32; 127/65; 127/67; 127/69; 426/661

[58] Field of Search ............... 127/71, 32, 65, 127/67, 69; 426/661

[56] References Cited

U.S. PATENT DOCUMENTS

| | | | |
|---|---|---|---|
| 5,051,271 | 9/1991 | Iyengar et al. | 426/658 |
| 5,281,276 | 1/1994 | Chiu et al. | 127/65 |
| 5,409,542 | 4/1995 | Henley et al. | 127/65 |

FOREIGN PATENT DOCUMENTS

| | | | |
|---|---|---|---|
| WO90/15147 | 12/1990 | WIPO | C12P 19/14 |

OTHER PUBLICATIONS

L. Gruchala et al., *Cereal Chemistry*, "Enzyme–Resistant Starch: Starches Using Differential Scanning Calorimetry", vol. 70, No. 2, 1993, pp. 163–170 month not available.

C. A. Knutson, *Cereal Chemistry*, "Annealing of Maize Starches at Elevated Temperatures", vol. 67, No. 4, 1990, pp. 376–384 month not available.

R. Hoover, et al., *Carbohydrate Research*, "The Effects of Defatting and Heat–Moisture Treatment on the Retrogradation of Starch Gels From Wheat, Oat, Potato and Lentil", 261, 1994, pp. 13–24 month N/A.

R. Hoover, et al., *Carbohydrate Research*, "Effects of Heat–Moisture Treatment on the Structure and Physiochemical Properties of Cereal, Legumes, and Rubber Starches", 252, 1994, pp. 33–53 month N/A.

A. Kawabata, et al., *Starch/Starke*, "Microscropic Observation and X–Ray Diffractometry of Heat/Moisture–Treated Starch Granules", 46, Nr. 12, 1994, pp. 463–469 month N/A.

I. Larson, et al., *Starch/Starke*, "Annealing of Starch at an Intermediate Water Content", 43, Nr. 6, 1991, pp. 227–231 month N/A.

Y. Pomeranz, *European Journal of Clinical Nutrition*, "Research and Development Regarding Enzyme–Resistant Starch (RS) in the USA:A Review", 46 (Suppl. 2), 1992, pp. 563–568 month N/A.

*Primary Examiner*—Anthony McFarlane
*Assistant Examiner*—Patricia L. Hailey
*Attorney, Agent, or Firm*—Eugene Zagarella, Jr.

[57] ABSTRACT

A resistant granular starch with high dietary fiber content and the method of preparing this product wherein a high amylose starch having at least 40% by weight amylose content and a water content of 10 to 80% by weight is heated to a temperature of from about 60° to 160° C. to provide a granular starch which retains its granular structure and has a total dietary fiber content of at least 12%. Food products containing this resistant granular starch are also provided.

27 Claims, No Drawings

PROCESS FOR PRODUCING AMYLASE RESISTANT GRANULAR STARCH

BACKGROUND OF THE INVENTION

This invention relates to a process for preparing a resistant granular starch with high dietary fiber content. More particularly, this invention involves the preparation of a resistant granular starch by the selected heat-moisture treatment of high amylose starch and further to the use of this resistant granular starch in food products.

Starch, a complex carbohydrate, is composed of two types of polysaccharide molecules, amylose, a mostly linear and flexible polymer of D-anhydroglucose units that are linked by alpha-1,4-D-glucosidic bonds, and amylopectin, a branched polymer of amylose chains that are linked by alpha-1,6-D-glucosidic bonds. Starch is digested predominantly in the small intestine by the enzyme alpha-amylase. Alpha-amylase hydrolyzes alpha-1,4-D-glucosidic bonds and therefore hydrolyzes the amylose fraction of starch almost completely to simple sugars. Alpha-amylase does not hydrolyze the alpha-1,6-D-glucosidic linkages, resulting in less complete hydrolysis of the amylopectin fraction.

It is known that certain starch processing operations result in the transformation of starch into starch that is resistant to amylase, known simply as resistant starch. Resistant starch is not digested by amylase in the small intestine, but passes into the large intestine where research literature indicates it behaves with properties similar to dietary fiber. Resistant starch, thus has reduced caloric value because it resists digestion and is likely to be a factor in prevention of diverticulosis and colon cancer.

Resistant starch (RS) has been classified in the literature into three categories: RS1—physically inaccessible starch (e.g., starch embedded in a protein or fiber matrix, such as starch found in a whole grain); RS2—intact digestion resistant native starch granules (e.g., uncooked potato or banana starch); and RS3—retrograded digestion resistant starch (see Englyst and Cummings, "New Developments in Dietary Fiber", Planum Press, NY 1990).

Various methods have been reported for producing resistant starch. Many of these methods involve the RS3 retrograded type described above, and this follows the general belief that resistant starch is formed when the amylose fraction of starch is retrograded or recrystallized after the gelatinization of starch. The theory is that the flexible linear amylose molecules align themselves after gelatinization into tight linear configurations that can form helices or spheres making many of the alpha-1,4-glucoside linkages inaccessible to alpha-amylase.

U.S. Pat. No. 5,051,271 issued Sep. 24, 1991 to R. Iyengar, et al. discloses a food grade, non-digestible, low-calorie bulking agent derived from starch and a process for producing it. The process involves retrogradation of starch, followed by enzymatic or chemical hydrolysis to reduce or remove the amorphous regions of the retrograded starch.

WO 90/15147 published Dec. 13, 1990 to Y. Pomeranz, et al. discloses a method for preparing purified resistant starch by cooling a cooked starch paste to form a gel, homogenizing the gel in water, digesting away the non-resistant portions with alpha-amylase, and drying the remaining unconverted portion under low temperature.

U.S Pat. No. 5,281,276 issued Jan. 25, 1994 to Chiu, et al. involves a process for producing resistant starch from high amylose starches by gelatinizing a starch slurry, enzymatically debranching the starch, and isolating the starch product by drying or extrusion.

All of the methods described above involve dispersing and gelatinizing starch in large excess amounts of water, followed by retrogradation and the use of enzymes or acids, resulting in RS3-type resistant starch. These methods can be laborious, time consuming and result in low yields and the high water content leads to a costly drying step.

Native starch granules have some crystallinity and are known to be partially resistant to enzyme digestion. It is also known that heat treatment can change the properties of starch. However, no disclosure has been made for the preparation of resistant granular starch with high total dietary fiber content from high amylose starch.

SUMMARY OF THE INVENTION

A new different approach has been developed to prepare a resistant granular starch which has high levels of dietary fiber content. More particularly, this invention involves a method of preparing a resistant granular starch with high dietary fiber content by heating a high amylose starch having at least 40% by weight amylose content and a water content of from about 10 to 80% by weight at a temperature of from about 60° to 160° C.

The invention further involves resistant granular starch prepared in accordance with the above described heat-moisture treatment and having a total dietary fiber level of at least 12% and preferably at least 20% by weight.

This invention further relates to food products which contain the resistant granular starch with high dietary fiber content prepared using the heat-moisture treatment as described herein.

DETAILED DESCRIPTION OF THE INVENTION

The term "resistant starch" as used in this application is defined as total dietary fiber content (TDF) as measured by the Prosky et al. method, Journal of Assoication of Official Analytical Chemists (AOAC), 68, 677 (1985) described below.

The starches used in preparing amylase resistant granular starch may be any of several starches, native or converted. More particularly, high amylose starch, i.e., starch containing at least 40% by weight amylose has been found to be most suitable for use in this invention.

It is well known that starch is composed of two fractions, the molecular arrangement of one being linear and the other being branched. The linear fraction of starch is known as amylose and the branched fraction amylopectin. Starches from different sources, e.g., potato, corn, tapioca, and rice, etc., are characterized by different relative proportions of the amylose and amylopectin components. Some plant species have been genetically developed which are characterized by a large preponderance of one fraction over the other. For instance, certain varieties of corn which normally contain about 22 to 28% amylose have been developed which yield starch composed of over 40% amylose. These hybrid varieties have been referred to as high amylose or amylomaize.

High amylose corn hybrids were developed in order to naturally provide starches of high amylose content and have been available commercially since about 1963. Suitable high amylose starches useful herein are any starches with an amylose content of at least 40% and preferably at least 65% by weight. While high amylose corn starch has been especially suitable, other starches which are useful include those derived from any plant species which produces or can be made to produce a high amylose content starch, e.g., corn, peas, barley, wheat, potato, tapioca and rice.

The starch material useful in this invention also may include high amylose flour where the starch component of the flour contains at least 40% by weight of amylose. The term starch as used throughout this application is intended to include flour and when the high amylose content of flour is referred to throughout the application and claims, it is understood to refer to the amylose content of the starch component of the flour (e.g., 40% by weight of amylose based on the amount of starch in the flour). Such flour typically comprises protein (about 8 to 13% by weight), lipids (about 2 to 3% by weight) and starches (about 85 to 90% by weight) which include the specified high amylose content.

Another useful high amylose starch is a substantially pure starch extracted from a plant source having an amylose extender genotype, the starch comprising less than 10% by weight amylopectin. This starch which is useful as the starch base material is derived from a plant breeding population, particularly corn, which is a genetic composite of germplasm selections and comprises at least 75% by weight amylose, optionally at least 85% amylose (i.e., normal amylose) as measured by butanol fractionation/exclusion chromatography techniques. The starch further comprises less than 10%, by weight, optionally less than 5%, amylopectin and additionally from about 8 to 25% low molecular weight amylose. The starch is preferably extracted in substantially pure form from the grain of a starch bearing plant having a recessive amylose extender genotype coupled with numerous amylose extender modifier genes. This starch and the method of preparation are described in U.S. Pat. No. 5,300,145 issued to V. Fergason, et al. on Apr. 5, 1994, which is incorporated herein by reference.

The starch used in this invention may be unmodified or modified. Chemically modified starches include the conversion products derived from any of the former bases, for example, starch prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches.

In preparing the resistant granular starch of this invention it is necessary that the starting starch have a specified amount of water or moisture content and is heated to a defined temperature. By treating the starch under these conditions a granular resistant starch having a high amount of total dietary fiber content, as described hereinafter, will be prepared.

The total moisture or water content of the starch to be heat treated will be in a range of from about 10 to 80% by weight, preferably 20 to 45 and more preferably from about 30 to 40% by weight, based on the weight of the starch. It is important that this relative level of moisture is maintained during the heating step.

The starch with specified moisture content is heated at a temperature of from about 60° to 160° C. and preferably from about 90° to 120° C. While the most desirable temperature may vary slightly depending on the particular starch and amylose content, it is important the starch remain in the granular state and not lose its birefringent characteristic. Also, the time of heating can vary depending on the starch used, its amylose content, the level of total dietary fiber content desired as well as the amount of moisture and the heating temperature. Typically the heating time will be from about 0.5 to 24 hours and preferably from about 1 to 4 hours.

The most desired conditions for treating starch to obtain a high level of total dietary fiber are such that the granular structure of the starch is not destroyed and the granules are still birefringent. However, there may be some conditions such as at high moisture and high temperature where the starch granule may be partially swollen but the crystallinity is not completely destroyed. Under these conditions, the starch granule has not been completely destroyed and an increase in total dietary fiber may still be obtained in accordance with this invention. Accordingly, the term "granular starch" as used herein, includes starch which predominantly retains its granular structure and has some crystallinity.

After the heat treatment, the starch may be allowed to air dry to reach equilibrium moisture conditions or may be dried using a flash dryer or other drying means.

The resulting starch product which has been heated under defined conditions as described will still have a granular structure as evidenced by its birefringent characteristic when viewed under the microscope. The granular resistant starch product will have a total dietary content of at least 12% and preferably at least 20% by weight. The amount of total dietary fiber or resistant starch content is determined using a standard procedure developed by Prosky, et al., Journal of Association of Official Analytical Chemists (AOAC), 68, 677 (1985) as described below. The level of dietary fiber content of the starch will vary depending on the conditions used as well as the particular starch starting material.

The resulting granular starch product is also characterized by an onset melting temperature of at least about 90° C. as shown by differential scanning calorimetry (DSC) using a method described below.

The granular resistant starch product of this invention can be added to foods to contribute to the total dietary fiber present in the foods. Typical food products where the starch product can be added as a dietary fiber supplement include cereals such as ready-to-eat, puffed or expanded cereals and cereals which are cooked before eating; baked goods such as breads, crackers, cookies, cakes, muffins, rolls, pastries and other grain-based ingredients; pasta; beverages; fried and coated foods, snacks; etc.

The amount of granular resistant starch and dietary fiber which can be added and used in any given food will be determined to a great extent by the amount that can be tolerated from a functional standpoint. In other words, the amount of granular resistant starch and fiber used generally will be as high as will be acceptable in organoleptic evaluation of the food. Generally the granular resistant starch may be used in food applications at about 0.1 to 50%, by weight of the food and more particularly from about 1 to 25% by weight.

This invention is further illustrated by the following examples with all parts and percentages given by weight and all temperatures in degrees Celsius unless otherwise noted.

The following test procedures were used in evaluating the various resistant starch products made in accordance with this invention.

A. TOTAL DIETARY FIBER DETERMINATION

The following procedure outlines the Prosky Method for determining dietary fiber or resistant starch in foods according to Prosky, et al., *J. Assoc. Off. Anal. Chem.*, 68, 677 (1985).

Reagents:

(a) Ethanol 95% v/v, technical grade.

(b) Ethanol 78%. Place 207 ml $H_2O$ into 1 L volume flask. Dilute to volume with 95% EtOH. Mix and dilute to volume again with 95% EtOH if necessary. Mix.

(c) Acetone, reagent grade.

(d) Phosphate buffer, 0.05M, pH 6.0. Dissolve 0.875 g Na phosphate dibasic, anhydride ($Na_2HPO_4$) (or 1.097 g dihydrate) and 6.05 g Na phosphate monobasic monohydrate ($NaH_2PO_4$) (or 6.8 g dihydrate) in ca 700 ml $H_2O$. Dilute to 1 L with $H_2O$. Check pH with pH meter.

(e) Termamyl (heat stable alpha-amylase) solution—No. 120 L, Novo Laboratories, Inc., Wilton, Conn. 06897. Keep refrigerated.

(f) Protease. No. P-5380, Sigma Chemical Company. Keep refrigerated.

(g) Amyloglucosidase. No. A-9268, Sigman Chemical Company. Keep refrigerated. Alternatively, a kit containing all 3 enzymes (pretested) is available from Sigma Chemical Company, Catalog No. KR-185.

(h) Sodium hydroxide solution, 0.171N. Dissolve 6.84 g NaOH ACS in ca 700 ml $H_2O$ in 1 L volume flask. Dilute to volume with $H_2O$.

(i) Phosphoric acid solution, 0.205M. Dissolve 23.6 g $H_3PO_4$ACS (85%) in $H_2O$ in 1 L volume flask. Dilute to volume with $H_2O$.

(j) Celite C-211, acid-washed. Fisher Scientific Company.

Method:

Run blank through entire procedure along with samples to measure any contribution from reagents to residue.

Homogenize sample and dry overnight in 70° C. vacuum oven, cool in desiccator, and dry-mill portion of sample to 0.3 to 0.5 mm mesh.

Weigh duplicate 1 g samples, accurate to 0.1 mg, into 400 ml, tall-form beakers. Sample weights should not differ by 20 mg. Add 50 ml pH 6.0 phosphate buffer to each beaker. Check pH and adjust if necessary. Add 0.1 ml Termanyl solution. Cover beaker with aluminum foil and place in boiling $H_2O$ bath 15 minutes. Shake gently at 5 minute intervals. Increase incubation time when number of beakers in boiling $H_2O$ bath makes it difficult for beaker contents to reach internal temperature of 100° C. Use thermometer to ascertain that 100° C. is attained at 15 minutes. Total of 30 minutes in $H_2O$ bath should be sufficient.

Cool solutions to room temperature. Adjust to pH 7.5±0.1 by adding 10 ml 0.171N NaOH solution.

Add 5 mg protease. (Protease sicks to spatula, so it may be preferable to prepare enzyme solution just before use with ca 0.1 ml phosphate buffer and pipet required amount).

Cover beaker with aluminum foil. Incubate 30 minutes at 60° C. (Measure volume before heating.) Let precipitate form at room temperature for 60 minutes.

Weigh crucible containing Celite to nearest 0.1 mg, then wet and redistribute bed of Celite in crucible by using stream of 79% EtOH from wash bottle. Apply suction to draw Celite onto fritted glass as even mat. Maintain suction and quantitatively transfer precipitate from enzyme digest to crucible.

Wash residue successively with three 20 ml portions of 78% EtOH, two 10 ml portions of 95% EtOH, and two 10 ml portions of acetone. Gum may form with some samples, trapping liquid. If so, break surface with spatula to improve filtration. Time for filtration and washing will vary from 0.1 to 6 hours, averaging 1.2 hour per sample. Long filtration times can be avoided by careful intermittent suction throughout filtration.

Dry crucible containing residue overnight in 70° C. vacuum oven or 105° C. air oven. Cool in desiccator and weight to nearest 0.1 mg. Subtract crucible and Celite weight to determine weight of residue.

Analyze residue from sample of set of duplicates for protein and ash. Subtract protein and ash values from residue to obtain total dietary fiber (TDF) or amount of resistant starch.

Determination of TDF (%):

Blank = mg blank residue −

$$\frac{(\% \text{ protein in blank} + \% \text{ ash in blank}) \times \text{mg blank residue}}{100}$$

Determination of TDF (%):

$TDF \% =$ mg residue −

$$\frac{[(\% \text{ protein in residue} + \% \text{ ash in residue}) \times \text{mg residue}] - \text{blank}}{\text{mg sample (wt)}} \times 100$$

B. DIFFERENTIAL SCANNING CALORIMETRY (DSC)

The following procedure was used for obtaining differential scanning calorimetry (DSC) data. DSC measurements were performed on each of the samples with a Perkin-Elmer DSC-4 instrument equipped with a 3600 thermal analysis data station and a Perkin-Elmer graphics plotter 2 (Perkin-Elmer Corporation, Instrument Division, Norwalk, Conn.). Starch samples of ~10 mg were weighed accurately into a Perkin-Elmer stainless steel pan. About 40 mg of deionized water was added and the pan sealed and allowed to equilibrate overnight at 4° C. The DSC scan was run from 20° to 180° C. at 10° C./minute heating rate. An empty pan represented the reference sample.

EXAMPLE I

A 1400 g sample of Hylon® VII starch (as is moisture 10.6%), a product of National Starch and Chemical Company, containing about 70% by weight amylose content, was placed in a Ross Mixer, a double planetary mixer with standard blades (product of Charles Ross and Son Company). Six hundred (600) ml of water was added to the sample, the mixer closed and the starch and water mixed at room temperature for 10 minutes. This provided a sample having 37.4% by weight of total moisture content. The temperature was increased to 100° C. with continued mixing and kept there for a certain defined period of time and then cooled to 30° C. The sample was taken out of the mixer and air-dried. Several identical starch samples were prepared in the same manner to a total moisture content of 37.4% by weight. The samples were all heated to 100° C. and kept there for varying periods of time of 0.5 to 6 hours. The samples were analyzed for total dietary fiber content (TDF) using the Prosky method and for differential scanning calorimetry (DSC) data, using procedures previously described above. The results shown below in Table 1 indicate that TDF increased from 12.0% to 38.1 and 41.9% after 1 and 4 hour heat treatment respectively. Onset melting temperatures To, increased from 67.6 to 89.4 and 92° C. respectively. Also shown are peak temperatures Tp, and concluding temperatures Tc.

TABLE 1

Properties of Heat Treated Hylon VII (37.4% water, 100° C.) over varying time periods

| Time (hour) | % TDF | To (°C.) | Tp (°C.) | Tc (°C.) |
| --- | --- | --- | --- | --- |
| 0 | 12.0 | 67.6 | 89.5 | 144.5 |
| 0.5 | — | 87.4 | 99.1 | 140.5 |
| 1.0 | 38.1 | 89.4 | 101.0 | 145.9 |
| 2.0 | — | 90.8 | 102.0 | 146.9 |
| 4.0 | 41.9 | 92.0 | 103.7 | 149.6 |

EXAMPLE II

Samples of Hylon VII starch (70% amylose content) were prepared as in Example I having varying amounts of water content. All samples were heated to 100° C. for 4 hours and analyzed for TDF and DSC properties as in Example I as shown below in Table 2.

TABLE 2

Properties of Heat Treated Starch (100° C., 4 hours) with varying water content

| Water % | % TDF | To (°C.) | Tp (°C.) | Tc (°C.) |
| --- | --- | --- | --- | --- |
| Untreated Native Hylon VII | 12.0 | 67.6 | 89.5 | 144.5 |
| 10.6 | 22.8 | 66.3 | 88.8 | 140.9 |
| 37.4 | 41.9 | 92.0 | 103.7 | 149.6 |
| 70.0 | 20.9 | 97.9 | 105.2 | 140.0 |

The results show the significant increase in TDF or resistant starch when starch having a defined amount of water particularly at 37.4% is heat treated.

EXAMPLE III

Several starch samples, having varying amounts of amylose, were heat treated under conditions shown below in Table 3 in the manner described in Example I. The samples were Hylon V, a starch product of National Starch and Chemical Company, having about 50% high amylose content; Hylon VII another product of National Starch and Chemical Company having 70% amylose content; and VJR starch having high amylose content (normal) 78.3%, and low molecular weight amylose 18.7% bred as described herein and further in U.S. Pat. No. 5,300,145 issued Apr. 5, 1994.

TABLE 3

Comparative Heat Treatment of Different Starches

| Sample | Heating Conditions | % QTDF |
| --- | --- | --- |
| Untreated Hylon V | — | 5.0 |
| Hylon V (50% amylose) | 37% water, 90° C., 4 hours | 15.4 |
| Hylon VII (70% amylose) | 37% water, 100° C., 4 hours | 41.8 |
| VJR | 37% water, 100° C., 4 hours | 42.3 |

EXAMPLE IV

A sample of a fluidity (thin-boiling, acid converted) Hylon VII starch (70% amylose), a product of National Starch and Chemical Company, was prepared according to the method described in Example I. The sample starch had 37% total moisture content and was heated to 100° C. and kept there for 2.5 hours. The heat treated starch was evaluated and had a total dietary fiber (TDF) of 36.8% which was significantly better than an untreated sample of the same starch which had a TDF of 21.3%.

EXAMPLE V

A chemically modified, high amylose starch was prepared, heat treated and evaluated as follows. A VJR starch, a product of National Starch and Chemical Company, described in Example III and having 78.3% high amylose content (normal) and 18.7% of low molecular weight amylose was modified with 0.98% by weight of octenyl succinic anhydride under the following conditions. VJR starch (3000 g) was slurried into 4500 ml of water and the pH of the slurry was raised to 7.6 with 3% NaOH. While maintaining the pH at 7.5 to 7.6, 29.44 g of octenyl succinic anhydride was added with agitation. When the reaction no longer consumed caustic, the pH of the slurry was adjusted to 5.5 using HCl and the starch was then filtered and air dried.

The esterified starch, having a total moisture content of 37% was heat treated as in Example I at 100° C. with a heating time of 2.5 hours. The heat treated modified starch was evaluated and found to have a total dietary fiber (TDF) of 37.5%. This was significantly better than shown by a sample of the same modified starch that was not heat treated and had a TDF of 25.9%.

EXAMPLE VI

A sample of Hylon VII starch (70% amylose) was prepared and heat treated as in Example I (37% water, 100° C., 6 hours) and evaluated as an ingredient in oatmeal cookies.

Test Formulation - Oatmeal Cookies

| Ingredients | Amount % |
| --- | --- |
| A. | |
| Baka-Snak | 1.75 |
| Test Starch | 6.00 |
| Quick Cooking Rolled Oats | 21.65 |
| Brown Sugar | 14.10 |
| Flour | 13.20 |
| Granulated Sugar | 11.70 |
| Baking Soda | 0.40 |
| B. | |
| Butter or Margarine | 21.00 |
| Eggs | 10.20 |
| | 100.00% |

Preparation:

1. Mix all ingredients in A to uniform consistency
2. Cream butter in B
3. Add dry mix of A and slightly beaten eggs to butter. Blend to a uniform consistency.
4. Drop by teaspoonfuls onto an ungreased cookie sheet. Bake 10 to 12 minutes at 375° F.

The prepared cookie products containing the resistant starch of this invention was an acceptable product and had more spread than a control formulation prepared with increased rolled oats and suitable taste.

EXAMPLE VII

A sample of Hylon VII starch (70% amylose) was prepared and heated in a manner similar to Example I (37% water, 100° C.) but in two cycles where the product was cooled to 30° C. after each heating cycle and then flash-dried. This product was formulated as an ingredient in crackers.

Test Formulation - Crackers

| Ingredients | Amount % |
|---|---|
| A. | |
| Soft-A-Silk Cake Flour | 51.19 |
| Test Starch | 10.26 |
| Granulated Sugar | 4.52 |
| Sodium Bicarbonate | 0.82 |
| Calcium Phosphate | 0.82 |
| Salt | 0.51 |
| Malted Barley Flour | 0.92 |
| B. | |
| Shortening | 7.70 |
| C. | |
| Water | 20.00 |
| High Fructose Corn Syrup | 1.95 |
| Ammonium Bicarbonate | 1.28 |
| Sodium Bisulfate | 0.03 |
| | 100.00 |

Preparation:

1. Using a Kitchen Aid Mixer (with paddle attachment), dry blend A.
2. Add the shortening in Part B and mix for 2 minutes at speed #1.
3. Mix C until completely dispersed.
4. Add C slowly to mixer and mix 10 minutes at speed #2.
5. Sheet the dough onto Rondo Sheeter at a thickness of 1 mm.
6. Laminate four times and sheet to a final thickness of 1 mm.
7. Cut into desired pieces and bake for 8 minutes at 425° C.

The prepared cracker containing the resistant starch of this invention compared favorably with products prepared using Hylon VII Oat Bran, Refined Oat Fiber and a control with Soft-A-Silk flour in place of the test starch. The cracker with test resistant starch had both good taste and appearance.

EXAMPLE VIII

The use of the granular resistant starch of this invention in hot cereals was made and evaluated as follows. Five (5) g of Hylon VII high amylose starch (70% amylose) prepared and heat treated as in Example I (37.4° C. moisture, heated to 100° C. for 4 hours) and having a percent total dietary fiber (TDF) of 41.9, was added to a 35 g packet of Quaker's Instant Hot Cereal, Apples and Cinnamon. To the mixed cereal blend, hot boiling water 126 g was added. An additional cereal blend was prepared in the same manner but containing 11 g of starch sample and 145 g of hot water.

The prepared cereal samples were observed and tasted and compared with control samples comprised of the same cereal packet replacing the starch with an equal amount of Rolled Oats. The cereals containing the granular resistant starch were somewhat thinner in texture and had an acceptable mouthfeel and flavor in comparison to the controls.

EXAMPLE IX

A typical yellow cake containing the granular resistant starch of this invention and thus providing a fiber fortified cake was prepared having the following formulation:

Cake Formulation

| Ingredient | Amount (g) |
|---|---|
| Sugar | 237 |
| Shortening | 64 |
| Vanilla | 1.5 |
| Instant Pure-Flo F | 10.5 |
| Cake Flour | 156.6 |
| Sample Starch/Fiber | 7.4 |
| NFDM | 14 |
| Baking Powder | 5.5 |
| Salt | 3.5 |
| Whole Eggs | 100 |
| Water | 120 |
| Oil | 110 |
| Total | 830 |

The cake was prepared as described below using the Hylon VII, high amylose starch prepared in Example I and having a total dietary fiber (TDF) of 41.9%. Another sample cake was formulated using 7.7 g of sample starch/fiber which was the VJR starch of Example III having a total dietary fiber content (TDF) of 42.3%. A control cake was prepared using the same formulation without the sample starch/fiber (added the same amount of cake flour to replace starch/fiber and obtain 830 g total).

Other cakes were prepared using twice the amount of sample starch/fiber a) 14.8 g of Hylon VII starch (149.2 g of cake flour) and b) 15.4 g of VJR starch (148.6 g of cake flour).

The cakes were prepared as follows. The shortening was placed in mixer bowl and whipped slightly. The sugar was added and the blend mixed until uniform and light. The vanilla was then added. A dry mix of the starch, NFDM, baking powder and salt was made. Half the dry mix was added to the eggs, water and oil and blended to wet ingredients. The remaining dry mix was added, blended and mixed for 2 minutes on medium speed. The prepared formulation was then baked and the resulting cake products observed and evaluated as follows:

| Sample | Batter Density (g/cc) | Batter Viscosity (Brookfield CPS) | Height Edges (Ave. Cm) | Height Center Cm | Volume (cc) |
|---|---|---|---|---|---|
| Control - 1 | 0.976 | 24.0 M | 2.60 | 2.8 | 1583 |
| Sample A (7.4 g - Hylon Starch) | 0.999 | 19.0 M | 2.60 | 2.7 | 1514 |
| Sample B (7.7 g - VJR Starch) | 1.000 | 20.5 M | 2.52 | 2.6 | 1467 |
| Control - 2 | 0.980 | 23.5 M | 2.5 | 2.9 | 1485 |
| Sample C (14.8 g - Hylon Starch) | 1.015 | 16.5 M | 2.42 | 2.7 | 1425 |
| Sample D (15.4 g - VJR Starch) | 0.997 | 20.0 M | 2.55 | 2.8 | 1450 |

The results showed that acceptable cakes with suitable taste were made using the added granular resistant starch/fiber of this invention.

EXAMPLE X

Pasta products were prepared using the resistant starch material of this invention in the following manner.

A sample of Hylon VII starch was heat treated as described in Example 1 at 100° C. for 2.5 hours. The sample was flash-dried with input temperature of 175° F. and output temperature of 150° F. The sample starch was prepared in two formulations shown below:

| Ingredients | Samples Amount lb) | | |
|---|---|---|---|
| | Control | Sample 1 | Sample 2 |
| Durum Wheat Flour (Cong Agra) | 25 | 17 | 14 |
| Heat Treated Hylon VII Starch | — | 3 | 6 |
| Water | 8.2 | 7.6 | 8.55 |

The ingredients were formed into pasta shaped products as follows. Water was added to the flour and starch, mixed and formed into a doughy material and then fed through an extruder to form the pasta shaped products. The products were dried in an oven at 120° F. dry bulb and 100° F. wet bulb to a moisture content of about 7%. The pasta was then cooked in boiling water for eight minutes. The cooked products were evaluated for appearance, firmness and taste and found to be acceptable.

EXAMPLE XI

A sports beverage was prepared by adding 5.96 g of Hylon VII starch prepared as in Example I (TDF of 41.9%) to 946 g Gatorade fruit punch. The beverage product was heated to 185° F. and hot filled into a beverage container. Beverages were then stored in a refrigerator until evaluation. Another beverage was prepared in a similar manner using 6.19 g of VJR starch prepared as in Example III (TDF of 40.34%).

The products were evaluated and showed some settling of particles and therefore needed some shaking and mixing to suspend the particles. The beverages with the added starch fiber showed no adverse flavor or mouthfeel when compared to the control which was the beverage with no starch product added. The results indicate that the starch products are useful in viscous type beverages.

EXAMPLE XII

This example illustrates the preparation of ready-to-eat extruded puffed cereals (also referred to as directly expanded cereals) containing heat treated high amylose starches prepared by the method of Example I (Hylon VII) and Example III (VJR). The starches were incorporated into the following cereal formulations:

| Ingredients | Control % (by weight) | Experimental % (by weight) |
|---|---|---|
| Starch | 0 | 15 |
| Oat Flour | 70 | 70 |
| Corn Flour | 20 | 5 |
| Sugar | 10 | 10 |
| Total | 100% | 100% |

The ingredients for the control were weighed out, charged into a one gallon jar, capped and set on rollers at 100 rpm for 3 hours to insure sufficient blending. Formulations (1,000 g) containing the starches were prepared in the same manner by replacing a portion of the corn flour. The cereal mixture was extruded using a Werner and Pflenderer ZSK-30 twin-screw, co-rotating extruder (oil heated barrels) with either an Acrison Model #105 volumetric feeder or Zeromax Model #E-2 feeder.

Extruder conditions were as follows:

| Barrel Length | 7 (L/D = 21) |
|---|---|
| Screw Configuration | SC 7-20A[a] |
| Screw Speed | 350 rpm's |
| Die Diameter | 3 mm |
| Dry Feed Rate | 13 kg/hr |
| Total Input Moisture | 17% |
| Barrel Temperature | 80/150/140° C. |

[a]SC 7-20A provides 2 reverse flights, 2 kneading blocks and 65 to 75% torque.

Cereal formulations blends were fed into the extruder using the above processing conditions. After steady state conditions were obtained (uniformity of exiting extrudates and steady torque readings), samples were die cut (using an automatic rotating die cutter) and measured for expansion using dial calipers. Samples were then toasted in a Narco mechanical convection oven at 200° to 210° C. for 2 to 5 minutes. Samples were evaluated for bulk density and expansion. Samples containing heat treated starches gave similar expansion and bulk density compared to the control (see table).

| Sample | Expansion (inches) | Bulk Density (lb/ft$^3$) |
|---|---|---|
| Control | 0.330 | 10.6 |
| Heat-treated VJR (4 hr at 100° C.) | 0.310 | 10.5 |
| Heat-treated Hylon VII (2 hr at 100° C.) | 0.308 | 11.3 |

What is claimed is:

1. A method for preparing a resistant granular starch with increased total dietary fiber content by heating a high amylose starch having at least 40% by weight amylose content under a combination of moisture and temperature conditions such that the starch remains in the granular state and is birefringent, the total moisture content of the starch being from about 10 to 80% by weight and the temperature being from about 60° to 160° C., with the resulting resistant granular starch having a total dietary fiber content of at least 12%.

2. The method of claim 1 wherein the high amylose starch has a total moisture content of from about 20 to 45%.

3. The method of claim 2 wherein the starch is heated at a temperature of from about 90° to 120° C.

4. The method of claim 1 wherein the high amylose starch is corn starch.

5. The method of claim 1 wherein the high amylose starch is chemically modified.

6. The method of claim 1 wherein the high amylose starch has a total moisture content of from about 30 to 40% by weight and the heating is at a temperature of from about 90° to 120° C.

7. The method of claim 1 wherein the high amylose starch has at least 65% by weight amylose content.

8. The method of claim 7 wherein the high amylose starch has a total moisture content of from about 20 to 45% and the heating is at a temperature of from about 90° to 120° C.

9. The method of claim 8 wherein the granular starch product has a total dietary fiber content of at least 20%.

10. The method of claim 9 wherein the high amylose starch has a total moisture content of from about 30 to 40% by weight.

11. The method of claim 1 wherein the high amylose starch is a substantially pure starch extracted from a plant source having an amylose extender genotype, the starch comprising less than 10% amylopectin determined by butanol fractionation/exclusion chromatography measurement.

12. The method of claim 11 wherein the high amylose starch has a total moisture content of from about 20 to 45% and the heating is at a temperature of from about 90° to 120° C.

13. A resistant granular starch product made by the method of claim 1.

14. A resistant granular starch product made by the method of claim 3.

15. A resistant granular starch product made by the method of claim 5.

16. A resistant granular starch product made by the method of claim 9.

17. A food product containing a food grade resistant granular starch having a total dietary fiber content of at least 12%.

18. A food product containing a resistant granular starch prepared by the method of claim 1.

19. The food product of claim 18 wherein the high amylose starch has a total moisture content of from about 20 to 45%.

20. The food product of claim 19 wherein the starch is heated at a temperature of from about 90° to 120° C.

21. The food product of claim 20 wherein the high amylose starch is corn starch.

22. The food product of claim 20 wherein the high amylose starch is chemically modified.

23. The food product of claim 18 wherein the high amylose starch has a total moisture content of from about 30 to 40% and the heating is at a temperature of from about 90° to 120° C.

24. The food product of claim 18 wherein the high amylose starch has at least 65% by weight amylose.

25. The food product of claim 24 wherein the high amylose starch has a total moisture content of from about 20 to 45% and the heating is at a temperature of from about 90° to 120° C.

26. The food product of claim 25 wherein the granular starch product has a total dietary fiber content of at least 20%.

27. The food product of claim 20 comprising cereal, bread, crackers, cookies, cakes, pasta, beverages, fried and coated foods and snacks.

* * * * *